(12) United States Patent
Albrecht et al.

(10) Patent No.: US 7,986,491 B2
(45) Date of Patent: Jul. 26, 2011

(54) HARD DISK DRIVE WITH DISK SEPARATOR FOR CREATING AXIAL GAPS BETWEEN DISKS FOR ACCESS BY READ/WRITE HEADS

(75) Inventors: Thomas R Albrecht, San Jose, CA (US); Hal J. Rosen, Los Gatos, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 477 days.

(21) Appl. No.: 12/248,117

(22) Filed: Oct. 9, 2008

(65) Prior Publication Data
US 2010/0091408 A1    Apr. 15, 2010

(51) Int. Cl.
*G11B 17/08* (2006.01)

(52) U.S. Cl. .................................. 360/98.07

(58) Field of Classification Search ............ 360/75, 360/97.04, 99.08, 234.2, 98.07, 254.1, 267.9; 720/672, 699
See application file for complete search history.

(56) References Cited

U.S. PATENT DOCUMENTS

| | | | | |
|---|---|---|---|---|
| 3,311,902 A | * | 3/1967 | Appleton | 360/266.2 |
| 3,484,760 A | * | 12/1969 | Sullivan et al. | 360/98.01 |
| 3,940,794 A | * | 2/1976 | Griffiths et al. | 360/98.03 |
| 4,164,767 A | * | 8/1979 | Gyi et al. | 360/98.03 |
| 4,208,685 A | * | 6/1980 | Matla et al. | 360/266.4 |
| 4,253,125 A | * | 2/1981 | Kanamuller | 360/98.05 |
| 4,318,145 A | * | 3/1982 | Frandsen | 360/267.9 |
| 4,754,447 A | * | 6/1988 | VanSant | 720/699 |
| 7,444,650 B2 | * | 10/2008 | Ito | 720/619 |

OTHER PUBLICATIONS

IBM Archives: IBM 350 Disk Storage Unit; Product Release Date—Sep. 4, 1956.

* cited by examiner

*Primary Examiner* — Angel A. Castro
(74) *Attorney, Agent, or Firm* — Thomas R. Berthold

(57) ABSTRACT

A hard disk drive (HDD) has a stack of disks mounted on a rotatable spindle with the disks being movable axially, i.e., in a direction parallel to the axis of rotation of the spindle. A disk separator is located inside the spindle and separates axially-adjacent disks in a pair to create an axial gap. Any pair of axially-adjacent disks can be separated so that different axial gaps are created. A single head-arm assembly with at least one and preferably two read write heads is movable axially so that it can be rotated by the rotary actuator into any one of the axial gaps. The read/write heads can thus access data on the disk surfaces in the axial gaps. When it is desired to have the disk separator create an new axial gap and thus a new pair of disk surfaces to be accessed, the actuator rotates the head-arm assembly away from the outer perimeters of the disks and moves the read/write heads onto a head support structure that supports the read/write heads off the disks.

20 Claims, 7 Drawing Sheets

HARD DISK DRIVE WITH DISK SEPARATOR FOR CREATING AXIAL GAPS BETWEEN DISKS FOR ACCESS BY READ/WRITE HEADS

BACKGROUND OF THE INVENTION

1. Field of the Invention

This invention relates generally to magnetic recording hard disk drives (HDDs).

2. Background of the Invention

Magnetic recording hard disk drives (HDDs) have a stack of rigid magnetic recording disks rotated by a spindle motor, and an actuator that moves the read/write heads across the surfaces of the rotating disks, with each disk surface being accessed by an associated read/write head. The disks in the stack are in a fixed position relative to one another and are not movable axially, i.e., in a direction parallel to the axis of rotation of the spindle motor. Each read/write head is formed on an air-bearing slider attached to one end of a suspension, and each suspension is attached at its other end to a rigid arm of the actuator. The conventional HDD can have high performance, i.e., low access time to read or write data, because all of the read/write heads are located on their associated disk surfaces and available to read or write data. However, this also increases the overall height of the disk stack because the axial spacing between the disks must provide sufficient space for the slider-suspension assemblies. Also, the requirement to have a read/write head for each disk surface increases the cost of the HDD.

What is needed is an HDD that may provide lower performance than a conventional HDD, but that has both increased volumetric data density and reduced data storage cost, in dollars per gigabyte ($/GB), than a conventional HDD.

SUMMARY OF THE INVENTION

The hard disk drive (HDD) has a stack of disks mounted on a rotatable spindle with the disks being movable axially, i.e., in a direction parallel to the axis of rotation of the spindle. A disk separator is located inside the spindle and separates axially-adjacent disks in a pair to create an axial gap. An axial gap is thus defined by the lower surface of the upper disk in the separated pair and the upper surface of the lower disk in the separated pair. Any pair of axially-adjacent disks can be separated so that different axial gaps are created. A single head-arm assembly with at least one and preferably two read write heads is movable axially so that it can be rotated by the rotary actuator into any one of the axial gaps. The read/write heads can thus access data on the disk surfaces that define the axial gaps. When it is desired to have the disk separator create an new axial gap and thus a new pair of disk surfaces to be accessed, the actuator rotates the head-arm assembly away from the outer perimeters of the disks and moves the read/write heads onto a head support structure that supports the read/write heads off the disks. In one embodiment the head support structure may be a head load/unload (L/UL) ramp structure.

In one embodiment the disk separator is movable axially along a control shaft that is rotatable inside the spindle about the axis of rotation of the spindle. The disk separator rotates with the control shaft but the control shaft is rotatable relative to the spindle. The disk separator includes ramps that engage radially inwardly extending tabs on the disks so that as the disk separator rotates a predetermined amount a disk is shifted up or down, depending on the direction of rotation. A differential rotation mechanism controls the rotation of the control shaft relative to the spindle.

For a fuller understanding of the nature and advantages of the present invention, reference should be made to the following detailed description taken together with the accompanying figures.

DETAILED DESCRIPTION OF THE INVENTION

Figure 1A:
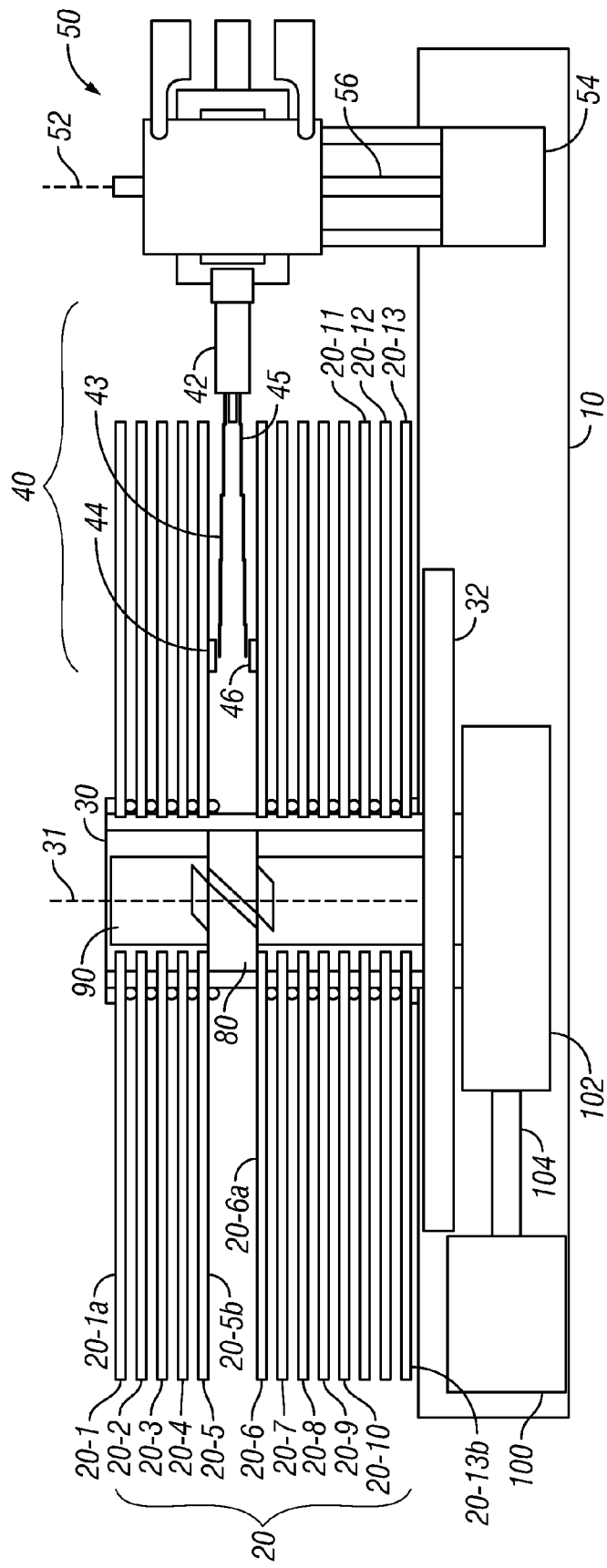
FIGS. 1A-1B are side views of an embodiment of the hard disk drive (HDD) of the invention illustrating two different positions of the head-arm assembly in the stack of axially-movable disks.
Figure 1B:
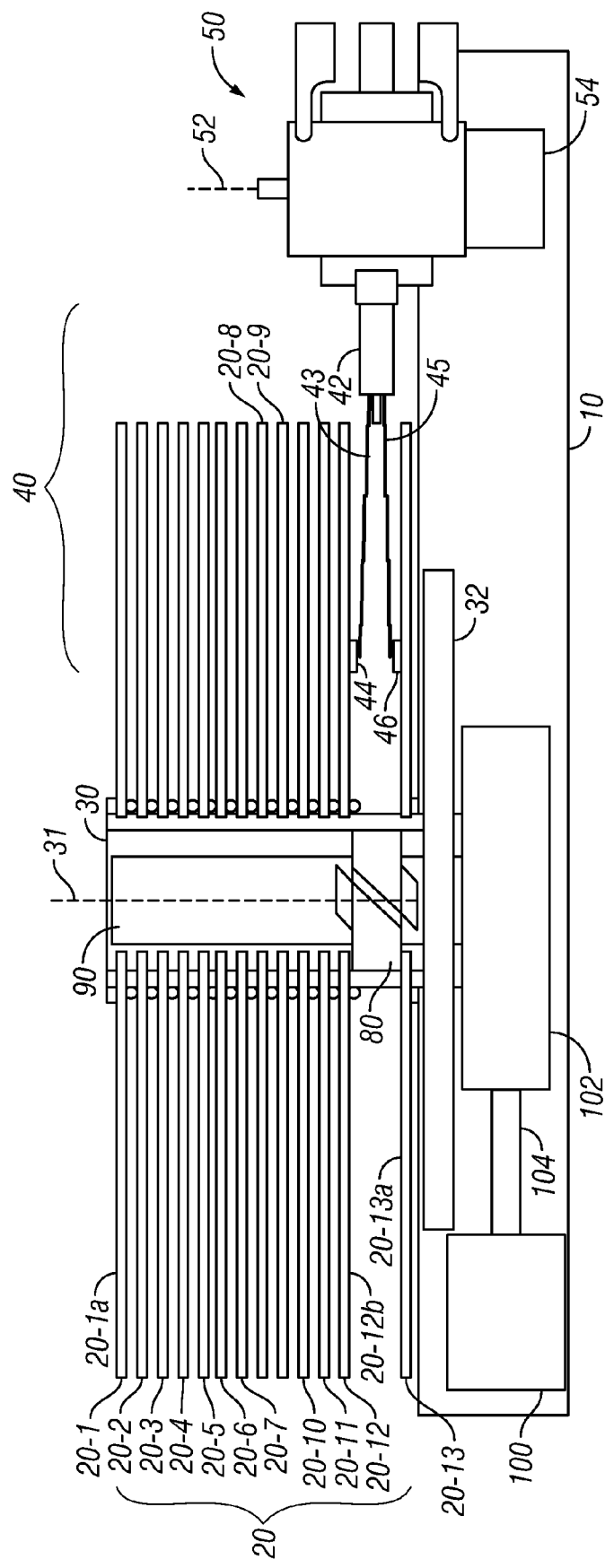

FIGS. 1A-1B are side views of the hard disk drive (HDD) illustrating an embodiment of the invention. The HDD has a base 10 with a stack of disks 20 (illustrated for example as 13 disks numbered as disks 20-1 through 20-13) on a rotatable spindle 30, and a single head-arm assembly 40 comprising a rigid arm 42 and two read/write heads on respective air-bearing sliders 44, 46. The spindle 30 is rotated about axis 31 by spindle motor 32 in base 10. Each disk has at least one of its surfaces and preferably both surfaces containing a magnetic recording layer for the storage of data. The sliders 44, 46 are attached to the rigid arm 40 by suspensions 43, 45, respectively. The suspensions 43, 45 include flexure elements that urge the sliders toward their respective disk surfaces, as is well known in the art.

The head-arm assembly 40 is rotatable by actuator 50 about axis 52. The actuator 50 is also movable axially relative to base 10 by arm-height stepper motor 54 which is connected to the actuator 52 by a lead screw 56. The height adjustment of head-arm assembly 40 relative to base 10 is shown by its two different positions in FIGS. 1A-1B. In FIG. 1A the head-arm assembly 40 is located within the axial gap between disks 20-5 and 20-6 with disk 20-5 having its lower data surface 20-5b accessible by the head on slider 44 and disk 20-6 having its upper surface 20-6a accessible by the head on slider 46. In FIG. 1B the head-arm assembly 40 has been moved lower and is located within the axial gap between disks 20-12 and 20-13 with disk 20-12 having its lower data surface 20-12b accessible by the head on slider 44 and disk 20-13 having its upper surface 20-13a accessible by the head on slider 46.

In contrast to the very first magnetic recording HDD, the well-known IBM RAMAC 305, which also had a single arm for accessing different disks in a large stack of disks, in this invention the disks 20 in the stack are not fixed in permanent positions on the spindle 30, but are movable axially up and down on the spindle 30. This is achieved by a disk separator 80 located inside the spindle 30, as explained in detail below, which separates any pair of axially-adjacent disks to create an axial gap. The disk separator 80 is attached to a control shaft 90 that causes disk separator 80 to rotate with the control shaft 90 but allows the disk separator 80 to move axially up and down the control shaft 90. The control shaft 90 is located inside the spindle 30 and is rotatable relative to spindle 30. A disk-stack stepper motor 100 in disk base 10 is connected to a differential rotation mechanism 102 by a differential shaft 104 and controls the rotation of control shaft 90 rotate relative to the rotation of spindle 30.

Because the head-arm assembly 40 is movable axially by arm-height stepper motor 54, the sliders 44, 46 can be rotated radially inside the different axial gaps created by different pairs of separated disks. This allows all the disks, except for the pair whose surfaces are being accessed by the heads on sliders 44, 46, to be spaced very closely together to achieve a higher volumetric efficiency than conventional HDDs. For the head-arm assembly 40 to move from the position in FIG. 1A to the position in FIG. 1B, it must first be rotated out of the axial gap between disks 20-5 and 20-6 and beyond the outer circumference of the disk stack. This is achieved by a head support (not shown in FIGS. 1A-1B) that also moves axially with the head-arm assembly 40 but does not rotate with it. This type of head support may be a conventional "load/unload" (L/UL) ramp structure onto which the sliders are "unloaded" off the disk and then later "loaded" onto the disks. After the sliders 44, 46 have been rotated out of the axial gap between disks 20-5 and 20-6 in FIG. 1A and unloaded off disk surfaces 20-5b, 20-6a onto the L/UL ramps, the disk separator 80 creates the new axial gap between disks 20-12 and 20-13 in FIG. 1B. The sliders 44, 46 are then moved off the L/UL ramps and loaded onto the disk surfaces 20-12b, 20-13a in FIG. 1B where they can be rotated across the disk surfaces in the newly-selected axial gap.

Figure 2:
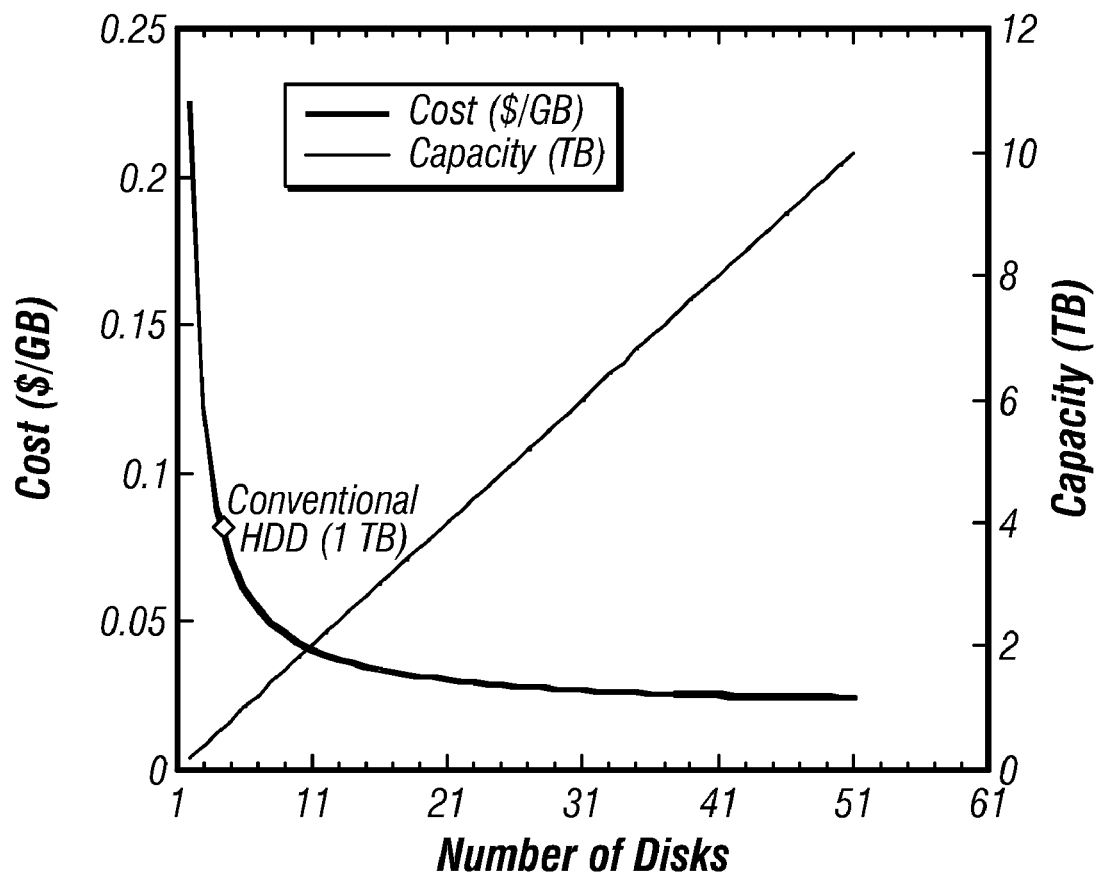
FIG. 2 is a graph of cost in dollars/gigabyte ($/GB) and capacity in Terabytes (TB) as a function of the number of disks in the HDD according to the invention.

The HDD according to this invention allows for a high-capacity, low-cost, in dollars per gigabyte ($/GB), HDD in a small form factor. This is illustrated in FIG. 2 where the capacity and $/GB are modeled as a function of the number of disks within the HDD. In the embodiment described in FIGS. 1A-1B, the top surface 20-1a of the top disk 20-1 and the bottom surface 20-13b of the bottom disk 20-13 are not be used for data. Therefore, a conventional HDD with N disks will have the same capacity as a HDD using this invention with N+1 disks. FIG. 2 is based on the following assumptions:
Storage capacity: 200 GB/disk
Cost for each head-suspension: $3
Cost for each disk: $4
Additional mechanical cost to implement this invention in the HDD: $5
Other costs for the HDD: $30

For comparison FIG. 2 also includes a modeled data point for the $/GB cost of a conventional 1 Terabyte (TB) HDD under the above assumptions with 5 disks and 10 heads but with no additional mechanical cost. As shown in FIG. 2, as the number of disks is increased in the HDD according to this invention, the $/GB decreases substantially while the capacity increases linearly. The $/GB cost reduces substantially with increasing number of disks and asymptotically approaches the $/GB cost for an individual disk, i.e., $0.02/GB. This relationship is similar to that for magnetic tape libraries and optical disk libraries. As an example, a 16-disk 3 TB HDD using this invention would cost only 58% of what a 15-disk 3 TB conventional HDD costs. For a 16-disk HDD according to this invention, assuming a disk thickness of 1.27 mm, an axial spacing between disks of 0.5 mm, and an axial gap of 1.6 mm required for the head-arm assembly to access separated disks, the overall disk stack height would be approximately 28.9 mm, which fits within a standard 42 mm high form-factor and leaves adequate room for mechanical components. If a larger number of disks is used, the cost reduction can be more than a factor of two; however, the HDD will no longer have a standard form-factor.

Figure 3:
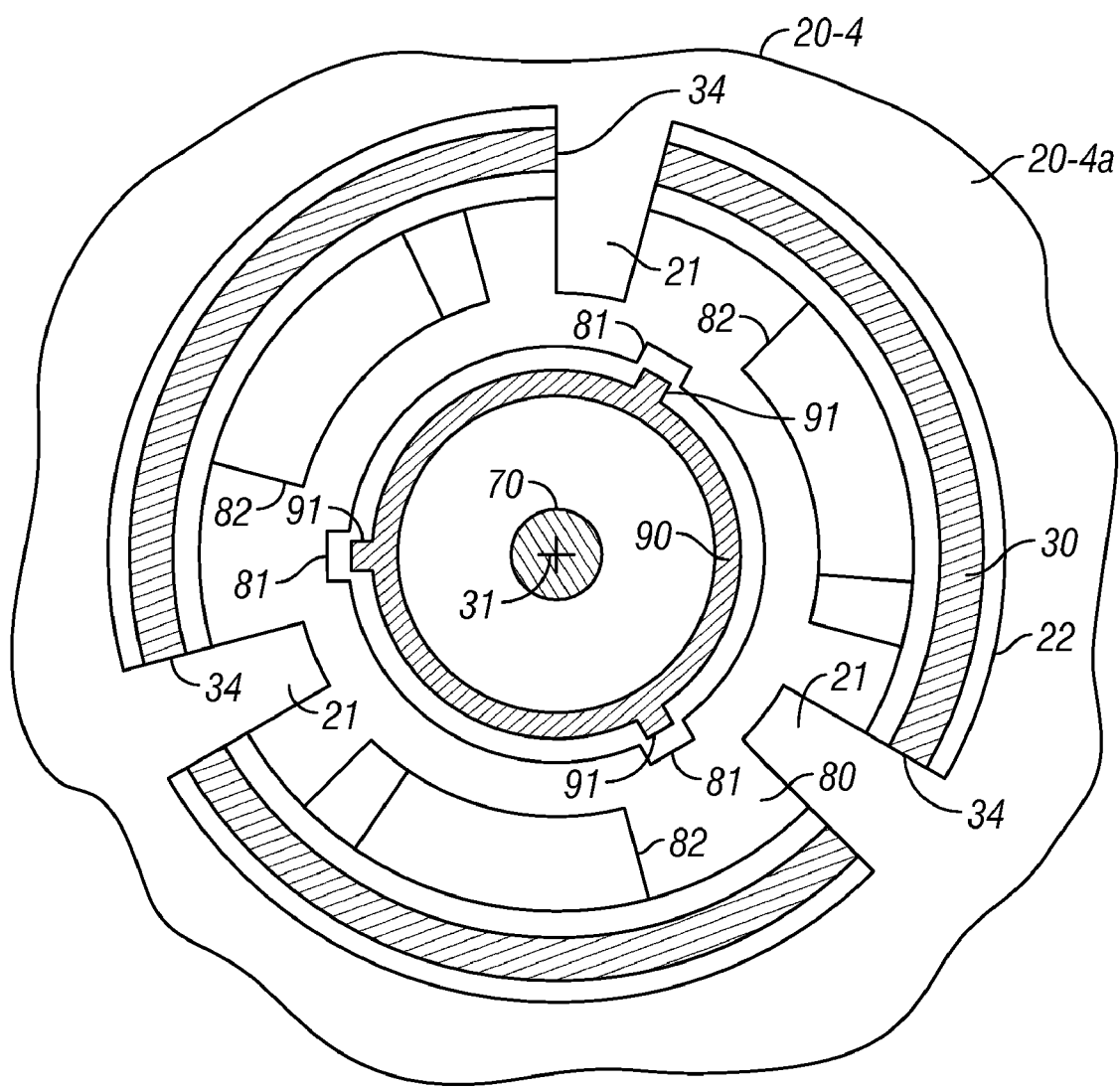
FIG. 3 is a top sectional view of the inside of the spindle taken through a section between two disks for illustrating the control shaft and disk separator for shifting disks in the disk stack in an embodiment of the HDD according to the invention.

FIG. 3 is a top sectional view of the inside of spindle 30 taken through a section between disks 20-4 and 20-5. Each disk, like disk 20-4, has a plurality of fingers or tabs 21 that project radially inwardly near the radially inner edge 22 of the disk. The spindle 30 is a hollow structure with longitudinal or axially-directed slots 34 into which the disk tabs 21 are inserted. The disks are arranged on the slotted spindle 30 so that the tabs 21 protrude through the wall of the slotted spindle 30 into the inside of the hollow spindle 30. Inside the spindle 30 is a fixed rod 70 attached to the disk drive base 10 (FIGS. 1A-1B). The center of rod 70 defines the axis 31 about which the spindle 30 rotates. The inside of the spindle 30 also contains the disk separator 80 and rotatable control shaft 90. The control shaft 90 is rotatable about axis 31 and is rotatable relative to rotatable spindle 30. The control shaft 90 includes longitudinal or axially-directed splines 91 and the disk separator includes longitudinal or axially-directed slots or keyways 81 for the splines 91. The splines 91 located in keyways 81 allow the disk separator 80 to move axially along the control shaft 90 but cause the disk separator 80 to rotate together with control shaft 90. FIG. 3 also shows the upper barbs 82 on upper surface of disk separator 80. The upper barbs 82 engage the tabs 21 on disk 20-4 when disk separator 80 is rotated counterclockwise in the manner explained more fully below.

Figure 4:
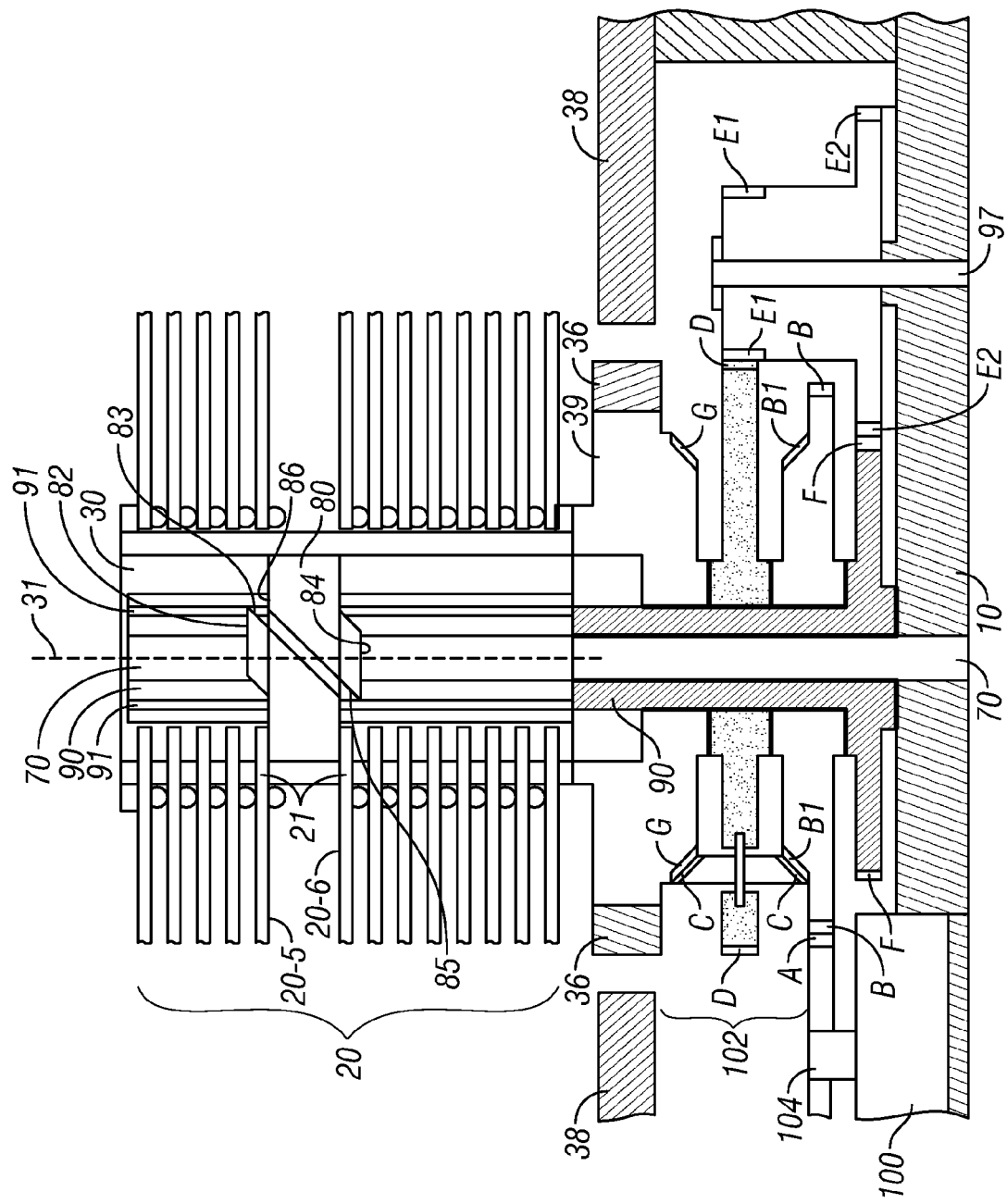
FIG. 4 is a sectional view through the disk stack and spindle for illustrating the operation of the disk separator in an embodiment of the HDD according to the invention.

FIG. 4 is a sectional view through the disk stack 20 and spindle 30 and illustrates the operation of disk separator 80. FIG. 4 shows one of the tabs 21 on each disk inserted in a slot 34 of the spindle 30. The disk separator 80 rotates with the control shaft 90. However, disk separator 80 is free to slide up and down on the control shaft 90 by virtue of the vertical splines 91 which mate with vertical keyways 81 on the inner radial surface disk separator 80, as shown in FIG. 3. When the spindle 30 is rotating in a steady state, i.e., not in the act of moving any disks up or down, all three tabs 21 on the disks immediately above and below the disk separator 80 rest against the upper and lower surfaces of the disk separator 80. In the steady state, the control shaft 90 and spindle 30 are rotated at the same angular velocity, i.e., no relative rotation between the spindle 30 and control shaft 90.

The disk separator 80 has three equally angularly spaced barb structures on its upper and lower surfaces. Only one pair of barbs, one upper barb 82 and one lower barb 84, is shown for simplicity in FIG. 4. There are helical slots on the outer surface of disk separator 80, as shown by slot 86 between upper barb 82 and lower barb 84. The helical slot defines inclined cam surfaces or ramps 83, 85. The slots extend only partially through the radial thickness of the disk separator 80 but are radially wide enough to accommodate the tabs 21 of the disks. When the control shaft 90 is rotated relative to the spindle 30 by $\frac{1}{3}^{rd}$ of a complete turn, a disk is transferred up or down in the stack. This can be understood by considering the case of rotating the control shaft 90 with the spindle 30 not rotating. If the control shaft is rotated clockwise so that the lower barb 84 in FIG. 4 moves to the left, the lower barb 84 will engage the tab 21 on disk 20-6 immediately to the left of the barb 84, and the tab 21 will travel through the slot 86. Simultaneously, the left edge of the upper barb 82 will engage the tab 21 of the disk 20-5 above the disk separator 80 immediately to the left of the upper barb 82. As the control shaft 90 is rotated, two things will occur: the disk separator 80 will move downward by one disk spacing and the disk immediately below the disk separator 80 will move upward to join the stack of disks above the disk separator 80. When the ⅓rd rotation of the control shaft 90 is completed, the axial gap between the pair of separated disks will have moved downward by one disk. While only one pair of barbs 82, 84 are shown in FIG. 4, there are three tabs on each disk, three pairs of upper and lower barbs on the disk separator 80, and three helical slots 86. The sequence of events described above occurs simultaneously for all three tabs on both disks (the disks immediately above and below the disk separator 80), and for all three pairs of barbs. Because all three tabs are engaged simultaneously by the barbs, the disk 20-6 is held level while it is being raised to join the disks above the disk separator 80.

Rotation of the control shaft 90 in the other direction (counterclockwise) relative to the spindle 30 will move disk 20-5 from above disk separator 80 to below disk separator 80. Thus the disks can be moved axially in either direction. Also, any two axially-adjacent disks can be separated to create an axial gap by merely rotating the control shaft in the correct direction by a selected amount of rotation. For example, rotation of control shaft 90 two complete turns will shift 6 disks from below the disk separator 80 to above the disk separator 80, so that the axial gap will be created between disks 20-11 and 20-12.

For ease of explanation, the above explanation of the operation of disk separator 80 was made for the case when the spindle 30 is stopped with a ⅓rd rotation applied to the control shaft 90. However, the same axial shifting of the disks can be achieved while the spindle 30 is rotating at its normal operating speed. In this steady state, the spindle 30 and control shaft 90 rotate together. By temporarily slowing down or speeding up the control shaft rotation speed relative to the spindle rotation, the disks and be raised or lowered. For each ⅓rd turn of relative rotation between the control shaft 90 and the spindle 30, one disk will move up or down, depending on the direction of relative rotation of the control shaft 90.

FIG. 4 also illustrates the connection of the spindle 30 and control shaft 90 to base 10 and to the differential rotation mechanism 102. The central fixed rod or shaft 70 is mounted to base 10. The control shaft 90 is rotatable about the fixed shaft 70 by a fluid bearing (represented by the solid black line between fixed shaft 70 and rotatable control shaft 90). The hollow spindle 30 is also rotatable about control shaft 90 by a fluid bearing (represented by the solid black line between spindle 30 and rotatable control shaft 90). The outer wall of spindle 30 supports a permanent magnet assembly 36. The spindle motor on base 10 is a brushless DC motor that includes a coil assembly 38 that interacts with the permanent magnet assembly 36 to rotate the attached spindle 30 about axis 31.

The controllable rotation of the control shaft 90 relative to the spindle 30 is achieved by the use of a differential rotation mechanism 102. In FIG. 4, there are four bodies that can rotate freely with respect to one another, but all have the fixed central shaft 70 with central axis 31 as their common axis of rotation. These are the spindle 30 with hub 39 and bevel gear G, gear D, gear B, and control shaft 90 with gear F. The spindle 30 has a hub 39 with a lower bevel gear G. Gear D rotates around control shaft 90 by a fluid bearing (shown as solid black line) and has a small bevel gear C rotating on a short shaft which is fixed within an opening in gear D. Gear B rotates around control shaft 90 by a fluid bearing (shown as solid black line) and is coupled to gear A, which is mounted on the differential shaft 104 of the disk-stack stepper motor 100. Gear B includes bevel gear B1. Gear F is rigidly attached to control shaft 90. The bevel gear C engages the teeth on bevel gear G of spindle hub 39 and the teeth on bevel gear B1 on gear B. The spindle hub 39 with bevel gear G, the gear B with bevel gear B1, and the bevel gear C mounted on gear D together function like a conventional differential gear mechanism, like that used in automobile drive trains. While fluid bearings are illustrated in FIG. 4, ball bearings or other types of bearing systems may be used.

The differential rotation mechanism 102 also includes a transfer gear E with gear E1 at a smaller outer diameter and gear E2 at a larger outer diameter. Gear E is rotatable about fixed shaft 97 mounted on base 10. Gear D engages gear E1 and gear F engages gear E2. In this embodiment the diameter of E2 is exactly two times the diameter of E1.

When the disk drive is running normally, i.e., the spindle 30 and hub 39 rotating but no shifting of disks axially, the stepper motor 54 is stationary, so gears A and B are stationary. The rotation of spindle hub 39, which is coupled to bevel gear 30 via gear G, causes gear D to rotate at half the rotation rate of the spindle hub 39, and in the same direction as the spindle hub 39. The rotation of gear D, which is coupled to gear E1 on transfer gear E, causes rotation of transfer gear E. The rotation of transfer gear E causes rotation of control shaft 90 via gear E2, which is coupled to gear F. The gear ratios of gear D, gear E1, gear E2, and gear F are selected so that gear F rotates at exactly twice the speed of gear D, and in the same direction as gear D. Since gear D is rotating at half the speed of the spindle hub 39, gear F and the control shaft 90 to which it is attached rotate at exactly the same speed as the spindle hub 39.

If the stepper motor 100 is now rotated, gear A on differential shaft 104 will rotate and cause gear B to rotate. If gear B rotates in the same direction as the spindle hub 39, gear D, which is coupled to bevel gear B1 on gear B via bevel gear C, will speed up and rotate faster than half the speed of the spindle hub 39. If gear B rotates in the opposite direction of the spindle hub 39, gear D will slow down and rotate at less than half the speed of the spindle hub 39. In this manner, rotation of the control shaft 90 relative to the spindle hub 39 can be achieved, resulting in movement of the disk separator 80 axially up or down, as explained above. The amount of relative rotation between control shaft 90 and spindle 30 is equal to the amount rotation imparted on gear B by the stepper motor 100. In the example described above, a ⅓rd rotation of the control shaft 90 relative to the spindle 30 is needed to raise or lower one disk in the stack, so a ⅓rd rotation of gear B by the stepper motor 100 will accomplish this. Thus, by rotating the disk-stack stepper motor 100 by ⅓ of a revolution, a disk can be raised or lowered, depending on the direction of rotation of the disk-stack stepper motor 100.

Figure 5:
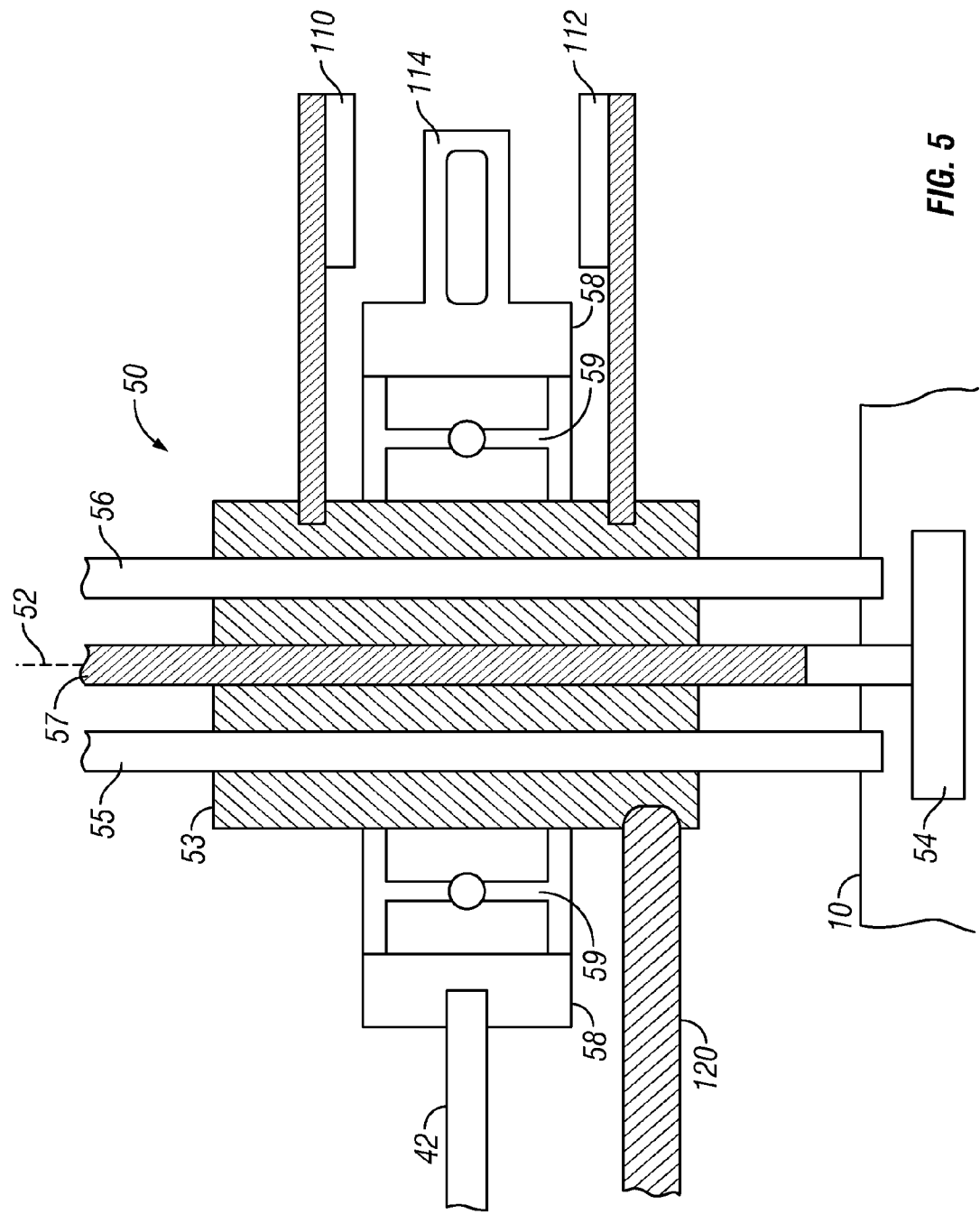
FIG. 5 is a partial sectional view of the rotary actuator on the HDD base for illustrating the manner in which the actuator is driven axially, i.e., in a direction parallel to the axis of rotation of the spindle in an embodiment of the HDD according to the invention.

FIG. 5 is a partial sectional view of actuator 50 on base 10 and illustrates the manner in which the actuator 50 is driven axially, i.e., in a direction parallel to axis of rotation 31 of spindle 30. The actuator 50 may be a conventional rotary voice coil motor (VCM) actuator with a coil movable through the magnetic field of a fixed permanent magnet assembly. The non-rotatable portion 53 of actuator 50 is movable axially along guide rails 55, 56 which are fixed to base 10. Portion 53 includes a threaded bore through which threaded lead screw 57 travels. Lead screw 57 is rotated by arm-height stepper motor 54 which acts to drive the actuator 50 axially by causing non-rotatable portion 53 to move up or down (away from or toward base 10). The non-rotatable portion 53 supports upper permanent magnet 110 and lower permanent magnet 112. The non-rotatable portion 53 also supports head support 120 which supports the sliders 44, 46 (FIGS. 1A-1B) off and away from the disks when the head-arm assembly is rotated out of the axial gaps. The rotatable portion 58 of actuator 50 rotates about axis 52 and is mounted to the non-rotatable portion 53 by bearing 59 which has its inner race secured to non-rotatable portion 53 and its outer race secured to rotatable portion 58. The rotatable portion 58 supports the arm 42 of head-arm assembly 40 (FIGS. 1A-1B) and the electrical coil assembly 114. The coil assembly 114 is connected to an electrical current source of the HDD by a flexible cable (not shown). Thus, referring to FIG. 1A and FIG. 5, in the operation of actuator 50 the arm-height stepper motor 54 turns the lead screw 57 to move the actuator 50 axially so the head-arm assembly 40 can access the selected axial gap of the selected pair of separated disks, and electrical current to coil assembly 114 causes rotation of the head-arm assembly 40 within the selected axial gap so the sliders 44, 46 can access the data tracks on disk surfaces 20-5b, 20-6a, respectively.

Figure 6:
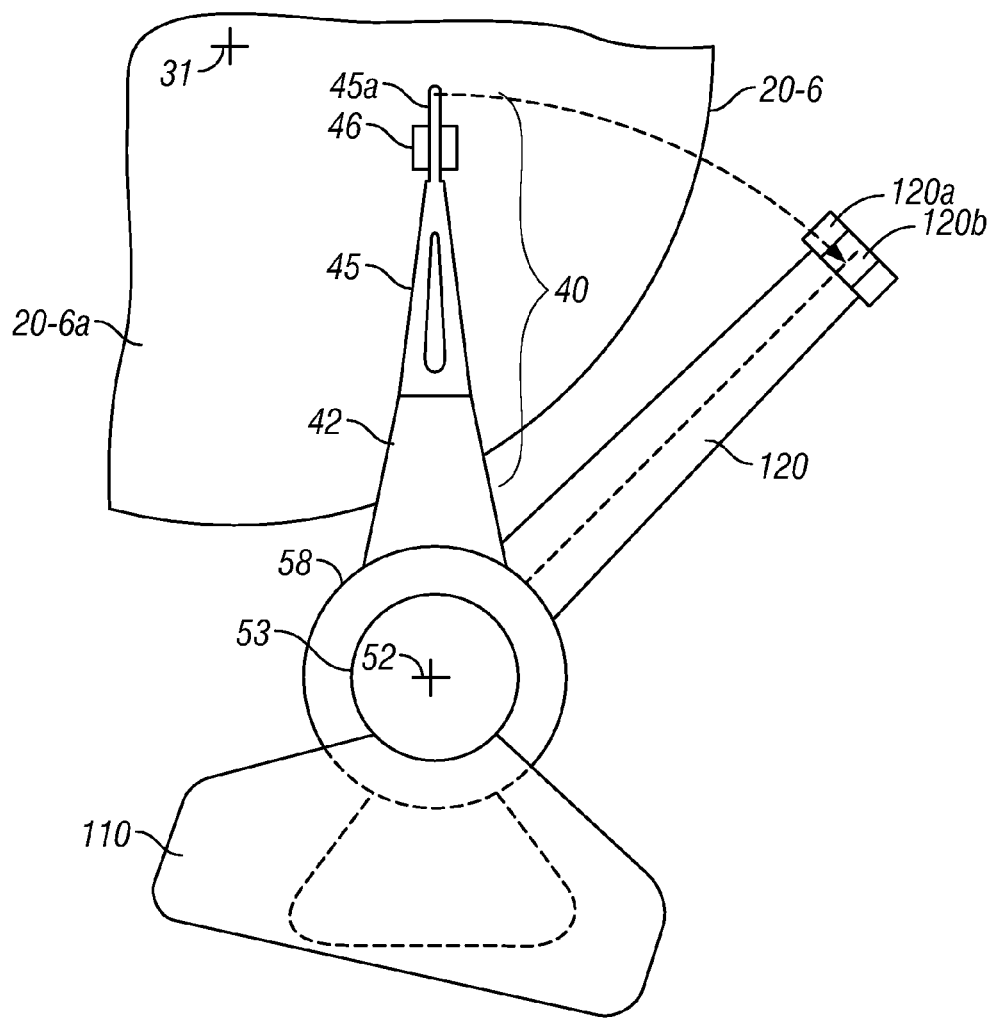
FIG. 6 is a top view of the rotary actuator for illustrating the head support with load/unload (L/UL) ramp structure fixed to the non-rotatable portion of the actuator in an embodiment of the HDD according to the invention.

FIG. 6 is a top view of actuator 50 and illustrates the head support 120 fixed to non-rotatable portion 53. The head support includes the L/UL structure of ramp 120a and recess 120b. In FIG. 6, only disk surface 20-6a and associated suspension 45 and slider 46 are shown. The suspension 45 includes an extension 45a. When the head-arm assembly 40 is rotated beyond the outer perimeter of disk 20-6, the extension 45a rides up ramp 12a into recess 120b to thereby "unload" the slider 46 off disk surface 20-6b. The actuator 50 can then be moved axially so the head-arm assembly 40 can access a different pair of separated disks. With the sliders unloaded from the disks, the disk separator 80 can be rotated to select a different pair of separated disks and thus a different axial gap. The head-arm assembly 40 is then rotated back toward the disk stack and the extension 45a is moved out of recess 102b and along ramp 102a to thereby "load" the slider 46 onto the surface of the newly-selected disk.

In the HDD as described above, various fail-safe sensors can be incorporated to reduce the possibility of mechanical failure. First, the state of rotation between the control shaft 90 and the spindle 30 can be measured to make sure that when an up or down shifting of a disk is completed, none of the barbs 82, 84 or inclined cam surfaces 83, 85 are engaging any disk tabs 21. This measurement can be achieved by optical sensors in the base 10 which can detect the rotation phase of both the control shaft 90 and spindle 30 from optically detectable features provided on control shaft 90 and spindle 30. Alternatively, the state of rotation of the spindle 30 can be determined from the brushless commutation system driving the brushless DC spindle motor 32 which rotates the spindle 30.

Sensors may also be used to confirm that the axial gap in the disk stack is the desired one. This can be accomplished by optical sensors that detect the absence of a disk at the desired location. Sensors may be also used to detect the axial height of the head-arm assembly and/or L/UL ramp to make sure they match the target axial gap in the disk stack.

Reconfiguration of the disk stack by the disk separator to allow the heads to access the tracks on surfaces of a different pair of disks can be relatively fast, although not as fast as a normal track access in a conventional HDD. The following is the sequence of operations to move the head-arm assembly into a different axial gap defined by a different pair of separated disks:

1. Rotate head-arm assembly and unload the sliders to the L/UL ramp structure;
2. Move rotary actuator, head-arm assembly, and L/UL ramp structure axially to access the new target disk stack axial gap location;
3. Rotate control shaft by $N \times \frac{1}{3}$ turns to move N disks up or down in the stack;
4. Confirm proper position via sensors if fail-safe sensors are used;
5. Load sliders from L/UL ramp structure back onto surfaces of newly-selected pair of disks; and
6. Rotate head-arm assembly to enable selected head to access target track.

The total time for these operations would be between about 0.1 to 2 seconds. Access times in this range are superior to what can be achieved using tape cartridges in a conventional tape library. Thus, the HDD according to this invention has a competitive advantage over conventional tape libraries.

While the HDD according to this invention can be used in applications like those for conventional HDDs, it is especially attractive for use with digital video recorders, camcorders, and in similar applications where large data files are streamed onto the storage media and/or the frequency of read/write accesses is relatively low. The HDD according to this invention is also especially attractive in applications where the recent and frequently-used data is stored on one or two disk surfaces and the infrequently-used data is stored on the other disk surfaces. For such applications, the overall performance is similar to a conventional HDD.

Figure 7:
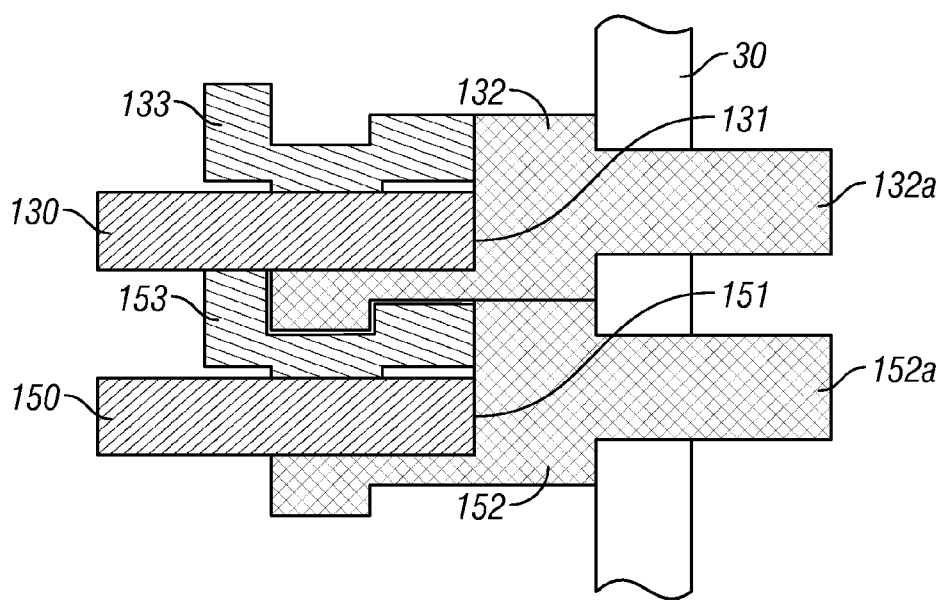
FIG. 7 is a sectional view of an alternative embodiment of the disks in the HDD according to an embodiment of this invention wherein the disks are clamped to clamping rings with one of the rings having radially inwardly extending tabs for engagement with the disk separator.

In the HDD as described above, each disk is cut or stamped so that there are tabs of disk material that extend radially inwardly near the disk inner diameter, as shown by tabs 21 on disk 20-4 in FIG. 3. As an alternative, each disk can have a conventional shape with a circular cutout and be securely attached to a clamping structure that has tabs projecting radially inwardly. In this disk clamping scheme, as shown in FIG. 7, each disk 130, 150 is clamped at its inside diameter 131, 151, respectively, with a two-part clamping structure. The clamping structure for disk 130 is a first rigid ring 132 with fingers or tabs 132a that extend into the slots in the wall of spindle 30 and a second rigid ring 133 that clamps disk 130 to the first ring 132. Similarly, the clamping structure for disk 150 is a first rigid ring 152 with fingers or tabs 152a that extend into the slots in the wall of spindle 30 and a second rigid ring 153 that clamps disk 150 to the first ring 152. With a clamping force externally applied to the two rings and disk, the two rings are then bonded together, for example by adhesive, spot welding, heat-shrink clamping or fasteners (such as threads on the mating surfaces). The first ring on one disk is shaped to fit into a recess of the second ring on another disk, so the disks can be stacked, as shown in FIG. 7. Because each clamping structure is sufficiently rigid, the stress applied by the disk separator to the tabs of the clamping rings will not be transmitted to the disk substrate, and no significant local bending of the disk substrate will occur.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A disk drive having a plurality of magnetic recording disks and at least one read/write head for writing data to and reading data from the disks, the disk drive comprising:
   a base;
   a spindle;
   a spindle motor attached to the base for rotating the spindle about an axis of rotation;
   a plurality of disks stacked on the spindle, each disk having at least one of its disk surfaces containing tracks for the storage of data;
   a disk separator movable axially inside the spindle for separating selected axially-adjacent disks, each pair of axially-adjacent disks defining an axial gap in the disk stack when the disks in a pair are separated;
   a rotary actuator on the base and rotatable about an axis generally parallel to the rotational axis of the spindle motor;
   a head-arm assembly comprising an arm and at least one read/write head attached to an end of the arm, the head-arm assembly connected to the rotary actuator and rotatable by the rotary actuator generally radially in the axial gaps to enable the head to access tracks on a surface of one of the axially-separated disks;
   a head support for supporting the head when the head-arm assembly is rotated radially outside an axial gap; and
   a driver connected to the rotary actuator for moving the head-arm assembly axially to enable the head-arm assembly to be rotatable in a selectable axial gap.

2. The disk drive of claim 1 further comprising a control shaft inside the spindle and rotatable relative to the spindle about the spindle axis of rotation, the disk separator being movable axially on the control shaft and rotatable with the control shaft.

3. The disk drive of claim 2 wherein the spindle includes a plurality of axial slots, each of the disks includes a plurality of tabs at its radially inner edge, and each of the disks is stacked on the spindle with its tabs located in the spindle slots.

4. The disk drive of claim 3 wherein the disk separator includes a plurality of inclined cam surfaces engageable with the disk tabs when the disk separator is rotated with the control shaft.

5. The disk drive of claim 3 further comprising a plurality of clamping structures, each clamping structure clamped to an associated disk at the disk's inner diameter, and wherein the disk tabs are located on the clamping structure.

6. The disk drive of claim 2 further comprising a differential rotation mechanism coupled to the control shaft and the spindle, a differential shaft coupled to the rotation mechanism, and a motor connected to the differential shaft for rotating the control shaft relative to the spindle.

7. The disk drive of claim 6 wherein the differential rotation mechanism comprises first beveled gear teeth on the spindle, a gear directly coupled to the differential shaft and having second beveled gear teeth, and a bevel gear coupled between the first beveled gear teeth and the second beveled gear teeth.

8. The disk drive of claim 1 wherein the head support is connected to the actuator and thereby movable by the driver axially together with the head-arm assembly.

9. The disk drive of claim 1 wherein the head support comprises a head load/unload ramp.

10. The disk drive of claim 1 wherein the actuator driver comprises a stepper motor on the base and further comprising a lead screw coupled to the stepper motor and the actuator.

11. The disk drive of claim 1 wherein the rotary actuator is a voice coil motor (VCM) actuator comprising a magnet assembly and an electrical coil rotatable through a magnetic field from the magnet assembly.

12. The disk drive of claim 11 wherein the actuator driver is on the base and coupled to the VCM for moving the VCM and connected head-arm assembly axially.

13. The disk drive of claim 12 wherein the head support is connected to the VCM and thereby movable by the driver axially together with the head-arm.

14. A disk drive having a plurality of magnetic recording disks and at least one read/write head for writing data to and reading data from the disks, the disk drive comprising:
   a base;
   a spindle;
   a spindle motor attached to the base for rotating the spindle about an axis of rotation;
   a plurality of disks stacked on the spindle, each disk having at least one of its disk surfaces containing tracks for the storage of data;
   a control shaft inside the spindle and rotatable relative to the spindle about the spindle axis of rotation;
   a disk separator inside the spindle and movable axially on the control shaft for separating selected axially-adjacent disks, each pair of axially-adjacent disks defining an axial gap in the disk stack when the disks in a pair are separated;
   a rotary actuator on the base and rotatable about an axis generally parallel to the rotational axis of the spindle motor;
   a head-arm assembly comprising an arm and at least one read/write head attached to an end of the arm, the head-arm assembly connected to the rotary actuator and rotatable by the rotary actuator generally radially in the axial gaps to enable the head to access tracks on a surface of one of the axially-separated disks;
   a driver connected to the rotary actuator for moving the rotary actuator axially to enable the head-arm assembly to be rotatable in the axial gaps; and
   a load/unload ramp structure connected to the rotary actuator and thereby movable by the driver axially for supporting the head when the head-arm assembly is rotated radially outside an axial gap.

15. The disk drive of claim 14 wherein the spindle includes a plurality of axial slots, each of the disks includes a plurality of tabs at its radially inner edge, and each of the disks is stacked on the spindle with its tabs located in the spindle slots.

16. The disk drive of claim 15 wherein the disk separator includes a plurality of inclined cam surfaces engageable with the disk tabs when the disk separator is rotated with the control shaft.

17. The disk drive of claim 15 further comprising a plurality of clamping structures, each clamping structure clamped to an associated disk at the disk's inner diameter, and wherein the disk tabs are located on the clamping structure.

18. The disk drive of claim 14 further comprising a differential rotation mechanism coupled to the control shaft and the spindle, a differential shaft coupled to the gear mechanism, and a motor connected to the differential shaft for rotating the control shaft relative to the spindle.

19. The disk drive of claim 14 wherein the rotary actuator driver comprises a stepper motor on the base and further comprising a lead screw coupled to the stepper motor and the actuator.

20. The disk drive of claim 14 wherein the rotary actuator is a voice coil motor (VCM) actuator comprising a magnet assembly and an electrical coil rotatable through a magnetic field from the magnet assembly.

* * * * *